(12) United States Patent
Kästner

(10) Patent No.: US 10,604,867 B2
(45) Date of Patent: Mar. 31, 2020

(54) REEL CHANGING DEVICE AND REEL CHANGING METHOD

(71) Applicant: B. BRAUN AVITUM AG, Melsungen (DE)

(72) Inventor: Falk Kästner, Bretnig-Hauswalde (DE)

(73) Assignee: B. Braun Avitum AG (DE)

( * ) Notice: Subject to any disclaimer, the term of this patent is extended or adjusted under 35 U.S.C. 154(b) by 156 days.

(21) Appl. No.: 15/668,333

(22) Filed: Aug. 3, 2017

(65) Prior Publication Data

US 2018/0051394 A1    Feb. 22, 2018

(30) Foreign Application Priority Data

Aug. 22, 2016   (DE) .................. 10 2016 115 497

(51) Int. Cl.

| | |
|---|---|
| *D01F 1/08* | (2006.01) |
| *B65H 54/58* | (2006.01) |
| *B65H 67/056* | (2006.01) |
| *D01D 5/24* | (2006.01) |
| *D01G 1/04* | (2006.01) |
| *B01D 63/02* | (2006.01) |
| *B65H 54/56* | (2006.01) |

(52) U.S. Cl.
CPC .............. *D01F 1/08* (2013.01); *B65H 54/58* (2013.01); *B65H 67/056* (2013.01); *D01D 5/24* (2013.01); *D01G 1/04* (2013.01); *B01D 63/021* (2013.01); *B01D 2323/42* (2013.01); *B65H 54/56* (2013.01); *B65H 2701/33* (2013.01)

(58) Field of Classification Search
CPC ...... B65H 54/56; B65H 54/58; B65H 67/056; B65H 2701/33
See application file for complete search history.

(56) References Cited

U.S. PATENT DOCUMENTS

| 4,276,687 A | 7/1981 | Schnell |
|---|---|---|
| 4,361,481 A | 11/1982 | Schnell |

(Continued)

FOREIGN PATENT DOCUMENTS

| DE | 3102331 A1 | 9/1982 |
|---|---|---|
| DE | 3318115 A1 | 11/1983 |
| DE | 19800484 A1 | 7/1999 |

(Continued)

OTHER PUBLICATIONS

German Search Report and Written Opinion for German Application No. 10 2016 115 497.0, dated Apr. 5, 2017, with translation—16 Pages.

(Continued)

*Primary Examiner* — William E Dondero
(74) *Attorney, Agent, or Firm* — RatnerPrestia

(57) ABSTRACT

A reel changing device is described for reeling fiber bundles from a fiber strand exiting a spinning device, including at least a first reel carrier and a second reel carrier on each of which a reel suited for winding up the fiber strand is arranged and which are movably received and guided in at least a first reel guide and a second reel guide so that the reels are adapted to be positioned one after another in an exit direction of the fiber strand so as to enable, in the case of a reel change, the fiber strand to be directly transferred from the first reel arranged on the first reel carrier to the second reel arranged on the second reel carrier. Moreover, a reel changing method in such reel changing device is described.

10 Claims, 2 Drawing Sheets

(56) References Cited

U.S. PATENT DOCUMENTS

2010/0308151 A1 12/2010 Doring et al.
2014/0230369 A1 8/2014 Reuschenbach et al.

FOREIGN PATENT DOCUMENTS

| DE | 69821760 | T2 | 9/2004 |
|----|----------|----|--------|
| EP | 0113323 | A2 | 7/1984 |
| EP | 0992447 | A1 | 4/2000 |
| EP | 2261158 | A2 | 12/2010 |
| GB | 2124263 | A | 2/1984 |
| JP | H10194606 | A | 7/1998 |
| WO | 8605468 | A1 | 9/1986 |
| WO | 2008067934 | A2 | 6/2008 |

OTHER PUBLICATIONS

Extended European Search Report for European Application No. 17183555.6, dated Jan. 5, 2018, including English translation, 14 pages.

REEL CHANGING DEVICE AND REEL CHANGING METHOD

CROSS REFERENCE TO RELATED APPLICATIONS

This application claims priority to German application DE 10 2016 115 497.0 filed Aug. 22, 2016, the contents of such application being incorporated by reference herein.

FIELD OF THE INVENTION

The present invention relates to a reel changing device provided for reeling/winding a (hollow) fiber strand exiting a spinning device. The invention further relates to a reel changing method for reeling fiber bundles in such reel changing device.

BACKGROUND OF THE INVENTION

It is known from the state of the art to use hollow fiber bundles for manufacturing dialysis filters. Dialysis filters are basically employed in various extracorporeal blood treatment processes such as hemodialysis, hemofiltration or hemodiafiltration. For manufacturing dialysis filters, at first a hollow fiber strand continuously exiting a spinning machine/device is wound/reeled onto rotating reels or, respectively, reel wheels. As soon as a rotating reel or a rotating reel wheel, respectively, is completely wound up, the wound hollow fiber strand is removed from the reel wheel and is wrapped by a film/foil which serves, inter alia, for tight, i.e. closely adjacent fixation of the hollow fibers relative to each other. Subsequently, the hollow fibers are cut to a desired length and are inserted in a cylindrical filter cartridge/introduced/put into a filter casing. The wound foil now can be removed again.

In other words, when manufacturing a hollow fiber filter module at first a hollow fiber strand exiting a spinning device is combined/aggregated into a hollow fiber bundle. When said hollow fiber strand is wound onto a reel wheel, a number of hollow fibers H present in the hollow fiber bundle can be determined with a number of reel revolutions N ($H=2 \times N$). When the desired number of hollow fibers is provided on the reel, respectively, the reel wheel, the reel, respectively, the reel wheel has to be changed. This is done with the aid of a reel changing device/a reel changing method. From the state of the art, various manually operating or automated reel changing devices with dedicated reel changing methods are known.

It is known, for example, to provide, apart from a spinning device/machine, a reel dog/trestle/frame on which a reel and, respectively, a reel wheel is mounted in a (hollow) fiber exit direction. At first, a fiber strand is wound onto the reel wheel. After completion of the winding operation, the completely wound reel wheel is manually removed from the reel frame and is replaced with an empty reel wheel. As soon as the empty reel wheel is mounted on the reel frame, the fiber strand can be wound up again. In the meantime, the continuously exiting and forming fiber strand is sucked into the waste disposal. This manual reel changing method thus has the drawback, on the one hand, that great fiber strand loss/reject/waste is occurring and, on the other hand, that two manual users or operators are necessary for a rapid reel change.

DESCRIPTION OF THE RELATED ART

Moreover, a fully automated reel changing device is known from WO 2008/067934 A2. In the same, an exiting fiber strand is wound continuously and alternately onto two beam-type reels which are mounted on a joint reel support. The beam-type reels are juxtaposed in parallel and are arranged to be rotatable about a joint axis of rotation. During reel change, the beam-type reels are rotated about said joint axis of rotation by 180°. While on the one beam-type reel winding takes place, the wound hollow fiber strand can be removed or, respectively, harvested from the other beam-type reel. The reel device of WO 2008/067934 A2 has the drawback, however, that it has an extremely complicated structure in the technical respect and can only be operated in a fully automated manner. Furthermore, it is not feasible to keep the fiber strand tensioned when it is transferred from the one beam-type reel to the other beam-type reel so that in addition an upstream thread buffer is required to keep the fiber strand continuously exiting the spinning device tensioned.

SUMMARY OF THE INVENTION

Against this background, it is an object of the present invention to avoid or at least alleviate the drawbacks of the state of the art. Especially, an object of the present invention consists in providing a reel changing device and a reel changing method which enable easy and efficient handling, especially with respect to a continuous winding of (hollow) fiber strands and with respect to a subsequent removal of wound (hollow) fiber bundles and are suited both for manual and for automated operation.

Thus, easy and efficient reel change handling for winding hollow fiber strands/bundles is to be provided.

This object is achieved by a reel changing device comprising the features of the independent device claim and a reel changing method of the independent method claim. Advantageous embodiments and further developments are claimed in the subclaims and/or shall be explained hereinafter.

The invention at first relates to a reel changing device which is provided for, especially continuous, reeling of fiber bundles, especially hollow fiber bundles, from a fiber strand exiting a spinning device/frame and serves especially for manufacturing dialysis filters, comprising at least a first reel carrier/support and a second reel carrier/support on each of which a reel, especially suited for winding up the fiber strand, especially a reel wheel, is arranged and which are movably received and guided in at least a first guide means and a second guide means so that the two reels can be positioned one after another/behind each other/in tandem in an exit direction of the fiber strand so as to enable, in the case of a reel change, the fiber strand to be directly transferred from the first reel arranged on the first reel carrier to the second reel arranged on the second reel carrier.

Preferably, each of the at least two guide means is arranged to extend at least in portions close to a vertical plane spanned by an exit direction of the fiber strand. By reeling fiber bundles especially winding of a fiber strand on a reel, respectively, a reel wheel is to be understood. By a reel an object or an auxiliary means which is suited or prepared for winding and unwinding fiber strands is to be understood. Preferably, in the reel changing device according to aspects of the invention a wheel-type rotary reel is used which is referred to as a reel wheel. According to aspects of the invention, by a spinning device especially a (spinning) system or (spinning) machine which serves for producing continuously exiting fiber strands/hollow fiber strands is to be understood.

In the reel changing device according to aspects of the invention, two reel carriers, namely a first reel carrier and a second reel carrier, are provided which are guided in respective guide means. In other words, the first reel carrier is received and guided in a first guide means and the second reel carrier is received and guided in a second guide means. The guide means are preferably configured as guide rails. On the first reel carrier a first reel, respectively, a first reel wheel is arranged and on the second reel carrier a second reel, respectively, a second reel wheel is arranged.

In accordance with the invention, the first and second reels can be positioned one after another in an exit direction of the fiber strand. Preferably, the first and second reels are thus arranged to be spaced apart from each other in the exit direction of the fiber strand, especially adopting predetermined positions, when the fiber strand is transferred, in particular when the reel is changed. When the two reels, respectively, reel wheels are arranged to be spaced apart from each other in the exit direction of the fiber strand, i.e. have different distances or spaces from the spinning device, this facilitates the transfer of the fiber strand, especially when closely adjacent guide means are used.

Basically, the guide means or guide rails may have any design. For example, the guide means or guide rails may guide the reel carriers both along a curved path and along a straight path. Basically, the at least two guide means or guide rails may have any distance from each other, however they are preferably arranged at least in portions to extend close to a vertical plane spanned by an exit direction of the fiber strand. If this is the case, the two reel carriers and thus the reels, respectively, reel wheels retained/held thereon can be arranged, when a reel change is required, one after another, closely, respectively, adjacent to the afore-mentioned plane which may be referred to as yarn strand exit plane. This enables the fiber strand continuously exiting the spinning device to be directly transferred from one reel wheel to the other reel wheel. In this way, continuous reeling of fiber bundles is achieved.

Furthermore, it may preferably be provided to arrange the two guide means at least in portions to be closely adjacent/neighboring so as to allow or facilitate direct transfer of the fiber strand from the one reel to the other reel.

Thus, the present invention provides a technically easily realizable reel changing device which provides direct transfer of a continuously exiting fiber strand from one reel to the other reel. Hence alternate winding onto the two reels is enabled. After completed winding the reels can be preferably alternately replaced and, respectively, the reeled (hollow) fiber bundles can be removed. According to aspects of the invention, removing or, respectively, harvesting the (hollow) fiber bundles is thus integrated in the handling. Especially, the solution according to aspects of the invention requires no sucking of fiber strand waste during reel change so that there little or even no fiber strand loss will occur. The reel changing device may furthermore be operated both manually and in an automated manner. For manual operation only one user or operator is required.

It is advantageous when the guide means are formed as linear guides which are arranged especially adjacent to the spinning device, extending, preferably horizontally, away from a fiber strand exit side of the spinning device and arranged at least approximately in parallel to the exit direction of the fiber strand, and wherein the reel carriers are linearly movable within and along the linear guides.

A design of the guide means or, respectively, guide rails as linear guides constitutes a simple, low-cost and space-saving and thus also preferred embodiment of the reel changing device according to aspects of the invention. Preferably, the reel carriers are thus linearly movable away from and toward the spinning device along the linear guides. The linear guides are preferably horizontally arranged and are provided on the side of the spinning device on which the fiber strand exits. Of preference, the linear guides are arranged to extend at least approximately in parallel to the exit direction of the fiber strand and over their entire length close to the vertical plane spanned by the exit direction of the fiber strand. At least approximately in parallel means, in the present invention, an angle between the linear guide and the exit direction of the fiber strand within a range of from 0° to 22.5°. The vertical plane spanned by the exit direction of the fiber strand preferably extends between the two linear guides. In other words, the linear guides preferably do not intersect the above-mentioned plane and are arranged on different sides of the plane. The reel carriers may be arranged at any, also predetermined, positions along the linear guides.

One advantageous embodiment is that during the reel change the fiber strand is transferred from a reel close to the spinning device to a reel distant from the spinning device.

When the fiber strand is transferred in its exit direction from the first reel, which is preferably located at an axial end of the first linear guide close to the spinning device, to the second reel, which is preferably located at an axial end of the second linear guide distant from the spinning device, then relocation of the fiber strand can be achieved without any fiber strand buffers. For this purpose, especially the features are crucial that the reels exhibit sufficient distance from each other during relocation and the relocation is performed in the fiber strand exit direction. The linear guides thus preferably have a predetermined sufficient length which has to be adjusted especially to a velocity of the fiber exit.

Advantageously, thus the fiber strand is placed/put on a reel at a position of the respective reel carrier distant from the spinning device and the reel carrier moves along the guide means during winding of the fiber strand toward a position close to the spinning device.

It is achieved in this way that the fiber strand is placed onto the axial end of the two linear guides distant from the spinning device and the fiber strand is pinched off or cut from a completely wound reel at the axial end of the linear guides which is close or approximated to the spinning device. In this way, it is possible to relocate the fiber strand without any fiber strand buffer.

It is useful when each of the reel carriers comprises at least a guide portion and at least a holding portion receiving the reels in an especially rotational, movable and replaceable manner, wherein the holding portions of the (two) reel carriers are configured to be inwardly protruding and pointing toward each other so that each of the reels is arranged inside/on an interior side of the reel carriers, especially for reducing a distance of the two reels from each other.

In particular, the reel carriers are guided via their guide portion within and, respectively, along the linear guides/guide rails/guide means and are received therein. The reels, respectively, reel wheels are releasably, especially positively or non-positively, fastened and, respectively, received at the holding portions of the reel carriers. Easily releasable connections which are made by clipping on or engaging locking elements have turned out to be advantageous. Each of the holding portions of the two reel carriers is aligned inwardly toward the vertical plane spanned by the exit direction of the fiber strand so that each of the reels, respectively, reel wheels is arranged/attached/fastened on the inside/interior side of the reel carriers, i.e. facing or approximated to the afore-mentioned plane. This helps to further reduce a distance between the two reels, respectively, reel wheels and to move the two reel wheels more closely to the plane spanned by the exit direction of the fiber strand. Thus, relocation of the fiber strand from one reel to the other reel is further facilitated.

In an advantageous manner, the reel changing device includes a control device for controlling a, preferably motor-induced, rotational movement and/or torque of the reels and a, preferably motor-induced, movement of the reel carriers along the guide means so that the rotational movement of the reels and the movement of the reel carriers along the guide means are adjusted to each other and preferably a (partially) automated operation of the reel changing device is enabled.

Apart from a manual operation of the reel changing device according to aspects of the invention, also a (partially) automated operation thereof may thus be provided in accordance with aspects of the invention. For this purpose, a control device/controller comprising a or being formed by a processor (CPU) is required. The controller of the reel changing device may be provided integrated in the spinning device or as a separate unit. With the aid of the controller a rotary motor being located within the reel carriers can be controlled and a desired speed and a desired torque, respectively, can be applied thereto for driving the reels and reel wheels, respectively, to rotate. In order to keep the fiber strand continuously tensioned, it has turned out, for example, that it is of advantage to drive the reels irrespective of the speed by a defined torque.

Moreover, by the controller a (linear) drive motor can be controlled which is adapted to drive/move the reel carriers along the guide means/linear guides, especially in a translational manner. Preferably, the rotational movements of the reels/reel wheels and the, especially translational, movements of the reel carriers and thus of the reels along the guide means are adjusted, especially synchronized, to each other. Adjusting or synchronizing the two movements enables the fiber strand to be kept continuously tensioned during reel change.

It is further useful when each of the reels comprises a fiber strand guide means, a clamping means, a cutting means and holding means for a fiber strand start and a fiber strand end.

When placing or relocating the fiber strand, the fiber strand continuously exiting the spinning device preferably contacts initially the fiber strand guide means of the reel and via the latter is fed to a holding means for the fiber strand start. As soon as the fiber strand is held on the holding means, winding of the fiber strand may take place. When the fiber strand is completely wound, it is pinched off by the clamping means, is cut off by the cutting means and the fiber strand end is held by another holding means.

The subsequent transfer of the fiber strand from the one reel to the other reel can be carried out manually by a user. In a (partially) automated operation of the reel changing device according to aspects of the invention also a transfer gripper may be provided which seizes or grips the further continuously exiting fiber strand and supplies it to the other empty reel. It is also imaginable that transmission or transfer of the fiber strand from one reel to the other reel is carried out or assisted by sucking with a suction pipe.

Moreover, the invention relates to a reel changing method for reeling fiber bundles, especially hollow fiber bundles, from a (hollow) fiber strand exiting, preferably continuously, a spinning device/spinning machine in a reel changing device as afore described, comprising the steps of: placing the fiber strand onto the first one of the at least two reels the reel carrier of which is preferably located/provided at a position distant from the spinning device; and winding the fiber strand to the respective reel and, especially accompanying, simultaneously moving the respective reel carrier along the guide means toward a position close to the spinning device.

In an advantageous manner, the reel changing method further comprises the steps of: pinching off and cutting the fiber strand wound on the first reel at a position of the reel carrier close to the spinning device; and transferring the fiber strand to the second one of the at least two reels whose reel carrier is in a position distant from the spinning device.

It is expedient when the reel changing method moreover comprises the following steps of: moving the reel carrier present at the position close to the spinning device into the position distant from the spinning device; and replacing the filled, completely wound reel with an empty reel or directly removing the wound fiber bundle.

The method according to aspects of the invention allows for directly relocating the continuously exiting fiber strand as already described before from one reel to the other reel without any fiber strand buffer being required. The foregoing descriptions and, respectively, remarks concerning the reel changing device according to aspects of the invention are analogously applicable to the reel changing method according to the present invention.

In other words, the present invention thus enables simple and efficient reel change which can be especially easily handled and by which a manufacture of (hollow) fiber bundles from a continuously supplied fiber strand is improved. Said improvement is especially achieved by the fact that the continuously produced fiber strand can be directly relocated from one reel to the other reel and can constantly be kept tensioned. Accordingly, one reel can be removed and replaced, respectively, and a wound fiber bundle can be harvested, while the other reel winds up the fiber strand.

BRIEF DESCRIPTION OF THE DRAWINGS

The invention is best understood from the following detailed description when read in connection with the accompanying drawings. Included in the drawings are the following figures.

The Figures are merely schematic and exclusively serve for the comprehension of the invention. Like elements are provided with like reference numerals. The features of the individual embodiments or exemplary configurations may be exchanged for each other.

DETAILED DESCRIPTION OF THE PREFERRED EMBODIMENTS

Figure 1:
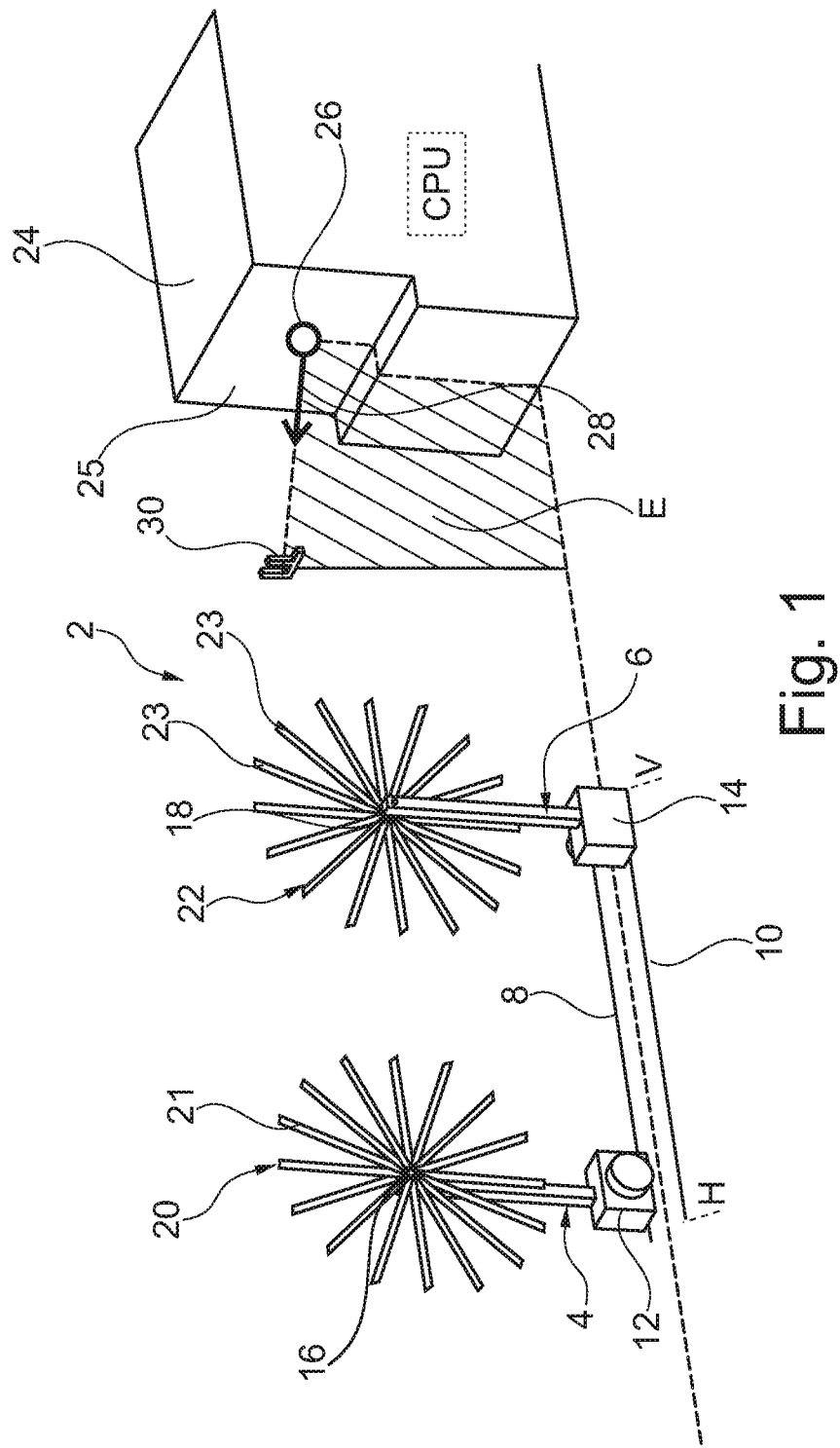
FIG. 1 shows a first embodiment of a reel changing device according to aspects of the invention.

In FIG. 1, a first embodiment of a reel changing device 2 is shown. The reel changing device 2 includes two reel carriers 4, 6, namely a first reel carrier 4 and a second reel carrier 6. The first reel carrier 4 is received and guided in a first linear guide 8. The second reel carrier 6 is received and guided in a second linear guide 10. The linear guides 8, 10 are located on the bottom. The reel carriers 4, 6 extend perpendicularly from the linear guides 8, 10 and thus away from the bottom. In particular, the reel carriers 4, 6 include guide portions 12, 14 via which the reel carriers 4, 6 are guided to be linearly movable in the linear guides 8, 10.

Each of the reel carriers 4, 6 includes holding portions 16, 18 in the form of retaining bolts. At the holding portion 16 of the first reel carrier 4 a first reel wheel 20 is releasably or replaceably arranged/fastened. At the holding portion 18 of the second reel carrier 6 a second reel wheel 22 is releasably or replaceably arranged/fastened. Each of the reel wheels 20, 22 may include fiber strand guiding means, clamping means, cutting means as well as holding means (which are not shown) for a fiber strand start and a fiber strand end. Each of the reel wheels 20, 22 has (16) arms 21, 23 that are evenly spaced from each other in the circumferential direction and extend in the radial direction.

From a spinning machine 24 on a fiber strand exit side 25 a fiber strand exit opening 26 is provided from which a fiber strand continuously exits in a fiber strand exit direction 28 toward a fiber strand guiding means 30 at a predetermined velocity. By the fiber strand exit direction 28 a vertical plane E indicated in FIG. 1 is spanned. There may also be provided clamping means, cutting means as well as holding means upstream of the reel wheels 20, 22 which are not shown in FIG. 1.

The linear guides 8, 10 are arranged in parallel to the plane E. On each side of the plane E one of the linear guides 8, 10 is provided. The linear guides 8, 10 and thus the reel carriers 4, 6 have a minimum distance from the plane E and thus also from each other. Especially an as small lateral distance as possible is provided between the linear guides 8, 10 and thus between the reel carriers 4, 6.

Each of the holding portions 16, 18 of the reel carriers 4, 6 perpendicularly points toward the plane E. In other words, the reel wheels 20, 22 fastened to the holding portions 16, 18 are arranged on the inside/interior side of the reel carriers 4, 6. In this way, a distance of the two reel wheels 20, 22 can be even further reduced. The reel wheels 20, 22 in other words are almost tangent to the plane E and have a minimum distance therefrom.

During operation, the continuously exiting fiber strand is placed onto the first reel wheel 20 the reel carrier 4 of which is located at a rear position H distant from the spinning machine 24 on the linear guide 8. Subsequently, the fiber strand is wound onto the reel wheel 20. Simultaneously with winding, the reel carrier 4 moves toward a front position V close/approximated to the spinning machine 24 and the reel carrier 6 moves toward a rear position H distant from the spinning machine 24 at the linear guide 10. As soon as the reel wheel 20 is completely wound, which may be determined, for example, by a revolution counter (not shown), the fiber strand is pinched off by the clamping means (not shown) on the reel wheel 20 and is cut off by the cutting means (not shown).

Then the fiber strand is directly transferred to the reel wheel 22 now being located at the rear position H and the further continuously exiting fiber strand is wound onto the reel wheel 22. By the fact that the fiber strand is transferred from a front position V to a rear position H and thus in the fiber strand exiting direction 28, the tension of the fiber strand can be maintained while the latter is transferred from the reel wheel 20 to the reel wheel 22. The reel wheel 22 is now wound up and, in so doing, is also moved slowly from the rear position H to a front position V. At the same time, the filled reel wheel 20 is moved from the front position V to the rear position H. Then the configuration shown in FIG. 1 is provided again. When the filled reel wheel 20 is provided at the rear position H, the reel wheel 20 can be replaced with an empty reel wheel or the wound fiber bundle can be removed and, respectively, harvested. Replacing a filled reel wheel 20, respectively, removing the wound fiber bundle thus is performed synchronously with the winding of the fiber strand on the reel wheel 22. The shown procedure is continuously repeated and can be performed manually by a user or in an automated manner.

During automated operation, a control having a CPU (indicated in dashed lines) is provided. with the control a rotational movement of the reel wheels 20, 22 as well as a horizontal movement of the reel carriers 4, 6 can be controlled in any way and can be adjusted to each other. As needed, both the rotational movement of the reel wheels 20, 22 and the horizontal movement of the reel carriers 4, 6 can be decelerated, accelerated or stopped. There can be provided a control, for example, which keeps the fiber strand tensioned even when the rotational movement of the reel wheels 20, 22 is completely stopped for transferring the fiber strand. This is achieved, for example, by an appropriate movement of the reel carriers 4, 6 or, as soon as the fiber strand has been transferred, by a temporarily faster rotation of the reel wheels 20, 22.

Figure 2:
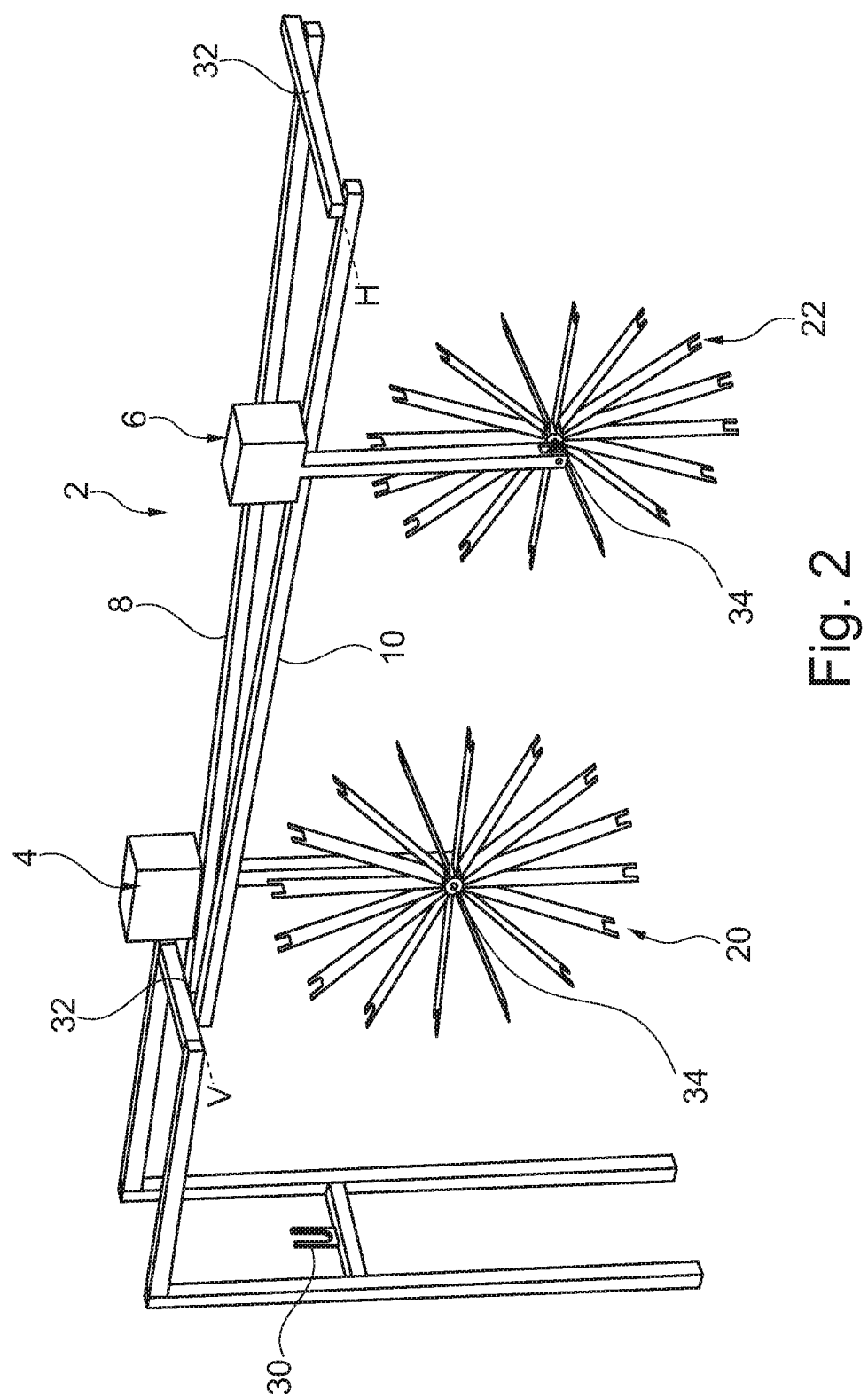
FIG. 2 shows a second embodiment of a reel changing device according to aspects of the invention.

FIG. 2 illustrates a second embodiment of a reel changing device 2. Hereinafter primarily the differences from the first embodiment will be discussed. The linear guides 8, 10 in FIG. 2 are not provided on the bottom but at a raised position. Moreover, the linear guides 8, 10 of FIG. 2 are not parallel but are formed to be merely approximately parallel and enclose an acute angle. Reel carriers 4, 6 are guided on the linear guides 8, 10 and extend perpendicularly downwards from the linear guides 8, 10. Reel wheels 20, 22 are replaceably and movably arranged on the reel carriers 4, 6. The reel carriers 4, 6 are movable between a front position V and a rear position H along the linear guides 8, 10. Both at the front position V and at the rear position H stops 32 are provided.

In the second embodiment, the fiber strand continuously exiting the spinning machine (not shown) is initially supplied to the fiber strand guiding means 30. From there the fiber strand is first placed on and wound onto the first reel wheel 20. As soon as the first reel wheel 20 is completely wound, the fiber strand is manually pinched off and cut off at the reel wheel 20 by a user or operator. Subsequently, the fiber strand is guided manually to the second reel wheel 22 which is close to the rear position H. After that, the fiber strand is placed/put onto the second reel wheel 22. While the second reel wheel 22 now winds up the fiber strand, it is slowly moved toward the front position V, i.e. to the left in FIG. 2. The filled or completely wound-up reel wheel 20 is moved or pushed manually to the rear position H, i.e. to the right in FIG. 2. This is followed by removal of the fiber bundle wound onto the reel wheel 20. This operation is repeated with each change of reel.

In the embodiment of FIG. 2, each of the reel wheels 20, 22 is driven by a defined torque by a reel wheel drive 34. In this way, the fiber strand may be kept evenly tensioned. The reel wheel drive can be stopped for removing or, respectively, harvesting the wound fiber bundles. The revolutions of the reel wheels 20, 22 can be detected with a revolution counter (not shown). A user or operator thus can be advised of an imminent reel change, for example. The reel carriers 4, 6 are horizontally displaced along the linear guides 8, 10 manually by the operator/user.

The invention claimed is:
1. A reel changing device for reeling fiber bundles from a fiber strand exiting a spinning device in an exit direction, the reel changing device comprising:
   a first reel guide and a second reel guide;
   a first reel carrier guided by the first reel guide and a second reel carrier guided by the second reel guide, each of the first reel carrier and the second reel carrier configured to receive a reel configured for winding the fiber strand;

wherein the first and second reel guides position the first and second reel carriers so that the reels received by the first and second reel carrier are positioned one after another in the exit direction of the fiber strand so as to enable, in the case of a reel change, the fiber strand to be directly transferred from the first reel arranged on the first reel carrier to the second reel arranged on the second reel carrier;

wherein during the reel change the fiber strand is transferred from the reel of the first or second reel carrier closest to the spinning device to the reel of the first or second reel carrier more distant from the spinning device.

2. The reel changing device according to claim 1, wherein the first and second reel guides are each linear guides arranged adjacent to the spinning device, extending horizontally away from the exit side of the spinning device, and arranged parallel to the exit direction, and wherein the first and second reel carriers are linearly movable within and along the linear guides.

3. The reel changing device according to claim 1, wherein the fiber strand is put onto the reel of the first or second reel carrier at a position of the respective reel carrier more distant from the spinning device and the respective reel carrier moves along the respective reel guide during a winding up the fiber strand toward a position close to the spinning device.

4. The reel changing device according to claim 1, wherein each of the first and second reel carriers comprises at least a guide portion and at least a holding portion configured to movably and replaceably receiving the reels, wherein each of the holding portions of the first and second reel carriers is formed to be inwardly protruding and pointing toward the other such that the reels are arranged on an interior side of the respective first and second reel carriers.

5. The reel changing device according to claim 1, further comprising a control device, wherein the control device controls at least one of a rotational movement or torque of the reels and a movement of the first and second reel carriers along the first and second reel guides such that the rotational movement of the reels and the movement of the first and second reel carriers along the first and second reel guides are adjustable.

6. The reel changing device of claim 5, wherein the control device enables at least partial automated operation of the reel changing device.

7. A reel changing method for reeling fiber bundles from a fiber strand exiting a spinning device in a reel changing device according to claim 1, the method comprising the steps of:

placing the fiber strand onto a first reel of the first reel carrier guided by the first reel guide when the first reel guide in located at a position distant from the spinning device; and winding the fiber strand onto the first reel and moving the first reel carrier along the first reel guide into a position close to the spinning device.

8. The reel changing method according to claim 7, further comprising the steps of:

pinching off and cutting off the fiber strand wound up on the first reel when the first reel carrier is located at a position close to the spinning device; and transferring the fiber strand to a second reel of the second reel carrier guided by the second reel guide located at a position distant from the spinning device.

9. The reel changing method according to claim 8, further comprising the steps of:

moving the first reel carrier with the cut fiber strand from the position close to the spinning device to a position distant from the spinning device; and replacing the reel with the cut fiber strand with an empty reel or directly removing the cut fiber strand.

10. A reel changing device for reeling fiber bundles from a fiber strand exiting a spinning device in an exit direction, the reel changing device comprising:

a first reel guide and a second reel guide;

a first reel carrier guided by the first reel guide and a second reel carrier guided by the second reel guide, each of the first reel carrier and the second reel carrier configured to receive a reel configured for winding the fiber strand;

wherein the first and second reel guides position the first and second reel carriers so that the reels received by the first and second reel carrier are positioned one after another in the exit direction of the fiber strand so as to enable, in the case of a reel change, the fiber strand to be directly transferred from the first reel arranged on the first reel carrier to the second reel arranged on the second reel carrier;

wherein during the reel change the fiber strand is transferred from the reel of the first or second reel carrier closest to the spinning device to the reel of the first or second reel carrier more distant from the spinning device;

wherein the fiber strand is put onto the reel of the first or second reel carrier at a position of the respective reel carrier more distant from the spinning device and the respective reel carrier moves along the respective reel guide during a winding up the fiber strand toward a position close to the spinning device.

* * * * *